Patented May 6, 1947

2,420,099

UNITED STATES PATENT OFFICE 2,420,099

PHENOLIC TYPE GERMICIDES AND PROCESS OF MAKING SAME

Anthony J. Salle, West Los Angeles, and Howard L. Guest, Ocean Park, Calif., assignors of one-half to Leo A. Gunther, Robbins, Calif.

No Drawing. Application October 27, 1942, Serial No. 463,542

5 Claims. (Cl. 167—31)

This invention relates to the phenol class of germicides, such as cresol, phenol, hexylresorcinol, resorcinol, and thymol, and has for objects the method of increasing the germicidal properties of germicides in this group and thereby permitting greater dilution without loss in killing power, and the resultant improved products of the method.

Heretofore solutions of the above group in concentrations that are effective as germicides, have been either sparingly soluble in water or caustic to tissue or both. Phenol and cresol in effective solutions are highly caustic to tissue, while thymol and hexylresorcinol are sparingly soluble and might be used in higher germ killing concentrations without damage to tissue were they either more soluble or more toxic to bacteria. This invention accomplishes the result of so greatly increasing the germicidal properties, to wit, two to threefold, as to make the sparingly soluble materials such as hexylresorcinol and thymol highly effective in soluble solution and to so increase the germicidal properties of phenol, cresol and such caustic agents as to permit dilution of 2 to 3 times with water without sacrificing germ killing properties and correspondingly reducing the causticity of such materials.

The generally accepted criteria for comparing germicides is by comparing the greatest lethal dilution of the germicide with the greatest lethal dilution of phenol in 10 minutes exposure to the organism most likely to be the object of disinfection. Germicides are then generally considered effective in a dilution corresponding to 5% phenol against the organism in question.

When tested by standard methods the greatest lethal dilution of phenol in 10 minutes is about 1:100 against *Staphylococcus aureus*, and considered effective in a 5% solution, cresol 1:300 and considered effective in a 3% solution, both solutions being highly caustic to tissue. The greatest dilution of thymol is 1:2500 and therefore would be effective in a 1:500 dilution which is insoluble in water. Hexylresorcinol's greatest lethal dilution to *Staphylococcus aureus* is about 1:6000 and would be considered effective in 1:1000 dilution which is about the peak of its solubility. It is pertinent to note, however, that a greater concentration is desirable when practical from the standpoint of solubility and/or causticity. This invention accomplishes the result of maximum germicidal effect of the products with minimum concentration and causticity, thereby overcoming the solubility and causticity objections while materially increasing the effectiveness of such products as hexylresorcinol.

The above result is accomplished by adding to each gram molecular weight of the phenol, cresol, hexylresorcinol, resorcinol or thymol, or the homologous series of such phenol germicides, one equivalent weight of an oxidizing agent such as ferric chloride, ferric sulphate, manganic chloride or manganic sulphate, or any other oxidizing agent that will result in a soluble end product.

By the above addition, the greatest lethal dilution of phenol is increased from 1:100 to about 1:1400, cresol from 1:300 to 1:4000 and thymol from 1:2500 to 1:6000 and hexylresorcinol from 1:6000 to 1:24000. From the foregoing it will be noted that the cresol would be an effective germicide at a dilution of about 1:800 which would be relatively non-caustic as compared to standard 3% or 1:33 cresol and the improved phenol would be an effective germicide at 1:280 as compared to a 5% solution now considered effective and would be correspondingly less toxic, while thymol to be effective at all must at present be in a 1:500 dilution which is insoluble and therefore, nonexistent; whereas the improved thymol would be effective in a dilution of 1:1000 which is soluble and is relatively non-toxic. Hexylresorcinol is relatively non-toxic in a 1:1000 dilution and is an effective germicide but may be made 3 times as effective and still non-toxic by this method whereas a 3 times more effective solution would be insoluble.

It is obvious, therefore, that this invention makes it possible to produce phenol germicides in a greater germ killing concentration which is soluble at a correspondingly lower degree of causticity to tissue. The oxidizing agents are cheap and easily applicable and the invention may be used economically for either increasing the germ killing properties of present phenol germicides or for maintaining the present germ killing properties of said germicides at a lower concentration and hence lower the cost of manufacture.

The scope of the invention as claimed hereinafter is intended to include the homologous series of such germicides as phenol, cresol, hexylresorcinol, resorcinol, or thymol.

The use of the term one molecular weight of the oxidizing agent in the claims or an equivalent weight thereof, means, for example, $FeCl_3$ or $\frac{1}{2} Fe_2(SO_4)_3$ or $MnCl_3$ or $\frac{1}{2} Mn_2(SO_4)_3$.

Having described our invention, we claim:

1. A germicide substantially equal in killing power to *Staphylococcus aureus* of substantially a 1:100 phenol solution that comprises a substantially 1:1400 solution of phenol and a soluble, inorganic oxidizing agent in which the amount of said oxidizing agent is an equivalent molecular weight thereof to each gram molecular weight of the phenol.

2. A germicide substantially equal in killing power to Staphylococcus aureus of a 1:300 cresol solution that comprises a substantially 1:4000 solution of cresol and a soluble, inorganic oxidizing agent in which the amount of said oxidizing agent is an equivalent molecular weight thereof to each gram molecular weight of the cresol.

3. A germicide substantially equal in killing power to Staphylococcus aureus of a 1:6000 solution of hexylresorcinol that comprises substantially a 1:24000 solution of hexylresorcinol and a soluble, metallic oxidizing agent in which the amount of said oxidizing agent is one molecular weight thereof to each gram molecular weight of the hexylresorcinol.

4. The process of making a germicide which comprises the step of adding to one of the group consisting of: cresol, phenol, hexylresorcinol, resorcinol and thymol, an inorganic oxidizing agent that is soluble in a solution of any one of said group in the ratio of an equivalent molecular weight of the oxidizing agent to each gram molecular weight of the material selected from said group.

5. A germicidal product consisting of one of the group; cresol, phenol, hexylresorcinol, resorcinol and thymol and a non-precipitant, inorganic oxidizing agent soluble in a solution of any one of said group in the ratio of an equivalent molecular weight of the oxidizing agent to each gram molecular weight of the material selected from said group.

ANTHONY J. SALLE.
HOWARD L. GUEST.

REFERENCES CITED

The following references are of record in the file of this patent:

UNITED STATES PATENTS

| Number | Name | Date |
| --- | --- | --- |
| 659,621 | Kelsey | Oct. 9, 1900 |
| 57,174 | Napier | Aug. 14, 1866 |
| 1,677,823 | Gunzler | July 17, 1928 |
| 2,209,454 | Guest | July 30, 1940 |